United States Patent
Watabe et al.

(10) Patent No.: US 6,426,929 B1
(45) Date of Patent: Jul. 30, 2002

(54) INFORMATION RECORDING METHOD

(75) Inventors: Teruyasu Watabe; Kenya Yokoi, both of Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/348,667

(22) Filed: Jul. 6, 1999

(30) Foreign Application Priority Data

Jul. 3, 1998 (JP) .......................................... 10-189191
Oct. 30, 1998 (JP) .......................................... 10-310412

(51) Int. Cl.[7] .............................................. G11B 7/00
(52) U.S. Cl. .................................. 369/59.12; 369/116
(58) Field of Search ............................. 369/116, 59.11, 369/59.12, 13.24, 13.26, 13.25

(56) References Cited

U.S. PATENT DOCUMENTS 5,732,062 A * 3/1998 Yokoi et al. ............. 369/59.12

FOREIGN PATENT DOCUMENTS

JP 5-274678 10/1993
JP 6-12674 1/1994

* cited by examiner

Primary Examiner—Thang V. Tran
(74) Attorney, Agent, or Firm—Dickstein Shapiro Morin & Oshinsky LLP (57) ABSTRACT

An information recording method which forms marks or spaces based on the predetermined recording modulating method on a recording medium by radiating a light source using a multi-pulse line is disclosed. The information recording method comprises a head heating pulse and a head cooling pulse, followed by plural serial rear heating pulses and serial rear cooling pulses. The width of the rear heating pulse is constant in a view of time, regardless of the recording liner speed of the recording medium. When recording information comprising pulses N times as long as the channel clock cycle T by a laser ray from a laser source, the recording method uses constant angular velocity control comprising a constant recording frequency and a constant rotating angle velocity or zone constant angular velocity control which raises the recording frequency according to moving the laser ray to the outer area of each zone on the recording medium and a constant angle speed. In addition, the recording medium has a recording layer which changes into a crystal condition and an amorphous condition reversibly.

31 Claims, 9 Drawing Sheets

INFORMATION RECORDING METHOD

BACKGROUND OF THE INVENTION

I. Field of the Invention

The present invention relates generally to an information recording method. More specifically, the invention relates to a method for recording information on a disc which has a recording layer capable of changing to a crystal condition and to an amorphous condition reversibly.

II. Description of the Related Art

With the wide-spread use of multimedia products, read only media such as audio CD and CD-ROM media, as well as the optical information reproducing apparatus used to record and reproduce such discs have been widely used. Due to the desire of users to create their own customized media, write-once discs using a dye technique (commonly known as CD burning), magnetic optical discs (MO) and phase-change discs have also received great attention within the field.

With the advent of reducing the amplitude of the laser diode, minimizing the spot diameter by using a high numerical aperture (NA) objective lens and adopting a thin substrate, high capacity optical discs such as the DVD-ROM, DVD-R, DVD-RAM, DVD-RW have been made possible. Currently, the major focus is erasable DVD media, which will be the next step for recording multi-media with great storage capacity. However, phase-change discs can also provide the functionality of an erasable DVD in a more efficient manner.

In a phase-change disc, information is recorded by changing a recording layer into a crystal condition or an amorphous condition reversibly. It can record and reproduce information only by laser ray from the laser diode. However, it does not require an external magnet, as with MO discs. Furthermore, a phase-change disc is capable of "overwrite recording," which is the recording and erasing of information at the same time.

For example, a single pulse light waveform of the laser diode using the EFM (Eight Fourteen Modulation) pulse code modulation is used as a general recording waveform for recording information on such phase-change discs. However, in such a single pulse recording method, recording marks are crooked in the form of tears because of the regenerative action and insufficient amorphous phase formation, which falls short of the appropriate cooling speed. Therefore, recording marks with low reflective rates cannot be obtained.

As a conventional recording method for recording information on a phase-change disc, the recording marks are formed by the laser ray of a multi-pulse waveform with some recording power steps reproduced based on a recording rate such as 8–16 pulse code modulation, as shown in FIG. 1. This known practice solves the above problem.

Marked portions of the multi-pulse waveform comprise a head heating pulse "A" for preheating the recording layer of the phase-change disc until the melting point degree is exceeded, followed by plural serial heating pulses "B," and serial cooling pulses "C" between pulses "A" and "B." When the intensity of the head heating pulse A is Pwa, the intensity of the serial heating pulse B is Pwb, and the intensity of the serial cooling pulse C is Pwc. The result is the reproduction of the intensity Pr. Each intensity is set to the following expression.

$$Pwb \geq Pwa > Pwc = Pr$$

Space portions of the multi-pulse waveform comprise an erase pulse D. When the intensity of the erase pulse D is Ped, the intensity is set to the following expression.

$$Pwa > Ped > Pwc$$

Based upon those expressions, the marked portions are formed into an amorphous phase, which is based on the rapid cooling conditions among the heating pulses A, B and the cooling pulse C. The space portions are formed into a crystal phase based on the gradual cooling condition induced solely by heating. Therefore, the reflective rate difference between the amorphous phase and the crystal phase is fully obtained.

A mark position recording method (PPM) and a mark edge recording method (PWM) are used to record information on phase-change discs. Currently, the mark edge recording method is used in response to high density recordings. Since phase-change discs have information at both edges of the recording marks, when recording information on the phase-change discs by the mark edge recording method it is important that sufficient heating and rapid cooling are carried out on the disc and that the edges of the marks are formed clearly. Therefore, high recording power is desired which may be achieved by changing the angle of the disc and increasing the light power of the laser diode. With recent high density recording, it is possible to form minute marks on the disc by using a short wavelength laser and a high NA objective lens. However, in conventional basic recording, when the effective spot diameter of the recording spot and the shortest mark length, which are formed on the disc by the laser ray, are close to each other the shortest mark becomes long. Therefore, it is advantageous to configure a system such that the erase power is high and the edge of the marks are short.

As a point of reference, in the early days of CD-ROM or DVD-ROM technology, the Constant Linear Velocity (CLV) method, which increased recording capacity, was generally used as the speed control method for the spindle motor. However, when the rotating speed of the spindle motor is increased, for the purpose of significantly increasing the information transmission speed, the rotating angle speed has to be constant for the purpose of simplifying the motor control.

Another method, the Constant Angular Velocity (CAV) method, has a constant rotating angular velocity and a constant recording frequency. When using the CAV method, the linear speed on the disc for the laser ray is high and information recording density is low. This method records by moving the laser ray from the inner area to the outer area of the disc. The zone CAV method, commonly referred to as the ZCAV method, divides the disc surface into concentric circles, then records and reproduces using a constant frequency in each zone. The further the zone is to the outer edge, the higher the frequency. This method provides greater recording capacity, while the recording linear density does not change significantly among the zones.

When recording by the CAV and the ZCAV methods, as the laser moves from the inner area to tie outer area of a disc, the linear speed on the disc with reference to the laser ray is high. Therefore, the circuit design can be complicated because measures must be taken into account for the reduced power of the laser or the raise in the channel clock frequency. When recording information on a disc according to the CLV recording method, if the linear speed is too high or too low, the resulting recording may be unsatisfactory because such a linear speed condition causes a deterioration in the overwriting and increases the jitter on the disc.

For the purpose of resolving such a problem, for example, in an information recording method shown in Japanese unexamined patent publish (KOKAI) No 06-12674, when the relative speed between a recording disc and a laser ray is high, a pulse being a little shorter than an input pulse is radiated. However, such a pulse is not a multi-pulse. In an information recording method shown in Japanese unexamined patent publish (KOKAI) No 05-274678, the duty rate of the light pulse when radiating a laser ray in the outer area is greater than when radiating a laser ray in the inner area.

In the above-mentioned information recording method, the light pulse must be changed according to the radial position of the laser ray from the disc's center. This results in a complicated circuit structure for the laser radiating control unit. However, there is a conventional method which makes the multi-pulse width constant in view of time, regardless of the change in linear speed. In such a method, the higher the linear speed and the channel clock frequency, the higher the radiating rate of the multi-pulse is for the channel clock.

However, when recording information on the outer area or the inner area of the optical disc, where the multi-pulse width is constant in view of time, such conditions are not always suitable and may result in the overwriting and the jitter worsening.

SUMMARY OF THE INVENTION

It is therefore an object of the present invention to provided an information recording method, using CAV or zone CAV control, which improves the overwriting and jitter. Such a method provides for a rear heating pulse width in a multi-pulse line which is constant in view of time, regardless of the recording linear speed of a recording medium.

In accordance with the structure of the present invention, an information recording method forms marks or spaces based a predetermined recording modulating method, such as 8–16 pulse code modulation, on a recording medium. It does so by radiating a light source using a multi-pulse line, which includes a head heating pulse and a head cooling pulse, followed by plural serial rear heating pulses and serial rear cooling pulses. The width of the rear heating pulses are constant in a view of time, regardless of the recording linear speed of the recording medium. When recording information having pulses N times as long as the channel clock cycle T, by the laser ray from a laser source (where $N \geq 1$), the recording method uses a CAV control which utilizes a constant recording frequency and a constant rotating angular velocity or zone CAV control. The constant rotating angular velocity or zone CAV control raises the recording frequency as the laser ray moves from the outer area and out of each zone. Each zone is divided into concentric circles on the disc. There, the recording medium has a recording layer changing into a crystal condition and an amorphous condition reversibly.

In accordance with the first structure of the present invention, the information recording method is set such that the width of the head heating pulse remains at a constant rate for the channel clock cycle T.

In accordance with the second structure of the present invention, the information recording method is characterized by configuring the rate for the channel clock cycle T by changing the head heating pulse based upon the recording linear speed of the recording medium and the recording density of is the recording medium.

In accordance with the third structure of the present invention, the information recording method is characterized by setting the pulse number of the multi-pulse line and the width of the last cooling pulse change based upon a change in the recording density of the recording medium.

In accordance with the fourth structure of the present invention, the information recording method sets the rate for the channel clock cycle T of the head heating pulse width to be large, and sets the rate for the channel clock cycle T of the last cooling pulse width to be small. This condition is used in the area where the recording linear speed of the recording medium is lower than the center linear speed of the linear speed change and where the recording density is high.

In accordance with the fifth structure of the present invention, the information recording method is characterized by setting the rate for the channel clock cycle T of the head heating pulse width to be large, and making the rate for the channel clock cycle T of the last cooling pulse width to be small. This condition is used in the area where the recording linear speed of the recording medium is higher than the center linear speed of the linear speed change and the recording density is low.

In accordance with the sixth structure of the present invention, the information recording method is characterized by setting the rate for the channel clock cycle T of the head heating pulse width to be small, and making the rate for the channel clock cycle T of the last cooling pulse width to be large. This condition is used in the area where the recording linear speed of the recording medium is lower than the center linear speed of the linear speed change and the recording density is low.

In accordance with the seventh structure of the present invention, the information recording method is characterized by setting the pulse number of the multi-pulse line "N–2", and setting the rate for the channel clock cycle T of the last cooling pulse width to be large. This condition is used in the area where the recording linear speed of the recording medium is higher than the center linear speed of the linear speed change and the recording density is high.

In accordance with the eighth structure of the present invention, the information recording method includes suitable linear speed for recording. Moreover, the middle value of the linear speed width is set to change in response to the CAV control or zone CAV control in the above structure.

In accordance with the ninth structure of the present invention, the information recording method has a recording layer where the recording medium includes Ag—In—Sb—Te type recording material.

In the above first structure, it is possible to keep the overwriting quality and the jitter on the whole area of the recording disc in satisfactory condition.

In the above second structure, it is possible to prevent the head portion from having deficient power, while keeping the overwriting quality and jitter satisfactory, by changing the last cooling pulse width as illustrated above.

In the above third structure, data can be recorded in an ideal mark length by suitable laser power. It is possible to keep the overwriting quality and the jitter condition satisfactory by changing width of the last cooling pulse as illustrated above.

In the above fourth structure, based upon the above illustrated linear speed and recording density conditions, it is possible to keep the overwriting quality and the jitter on the whole area of the recording disc in satisfactory condition.

In the above fifth structure, based upon the above illustrated linear speed and recording density conditions, it is possible to keep the overwriting quality and the jitter on the whole area of the recording disc in satisfactory condition.

In the above sixth structure, based upon the above illustrated linear speed and recording density conditions, it is possible to keep the overwriting quality and the jitter on the whole area of the recording disc in satisfactory condition.

In the above seventh structure, based upon the above illustrated linear speed and recording density conditions, it is possible to keep the overwriting quality and the jitter on the whole area of the recording disc in satisfactory condition.

In the above eighth structure, even if the linear speed changes from the lowest speed to the highest speed, it is possible to keep the overwriting quality and the jitter on the whole area of the recording disc in satisfactory condition.

In the above ninth structure, the relation between the accumulated length from the head cooling pulse to the last cooling pulse and the mark length for the pulse illustrate a tendency for each to correspond to each other in a straight line, resulting in an easy to control mark length.

DESCRIPTION OF THE PREFERRED EMBODIMENTS

The preferred embodiments of an information recording method in the present invention will next be described in detail with reference to the accompanying drawing. The first embodiment of the present invention will next be described based upon FIG. 1 and FIG. 2.

The first embodiment is applied to an information recording method, where the recording code rate is based on the DVD-ROM format on a recording layer of a phase-change disc. The data modulating method records mark edges using an 8–16 modulating code, shown in FIG. 1. The present embodiment, using a recording disc and recording data, utilizes a laser diode which radiates with a multi-pulse line. The laser diode forms recording marks and records information. A marked portion of the multipulse waveform contains a head heating pulse "A" for preheating a recording layer of the phase-change disc to a temperature above the melting point, followed by serial heating pulses "B," and cooling pulses "C, Cr" between them. The head heating pulse power is Pwa, the power of the serial heating pulses B are Pwb, and the power of the serial cooling pulses are Pwc, resulting in reproducing power Pr. The space portion of the multi-pulse waveform includes an erase pulse "D," where its power is Ped.

Figure 2:
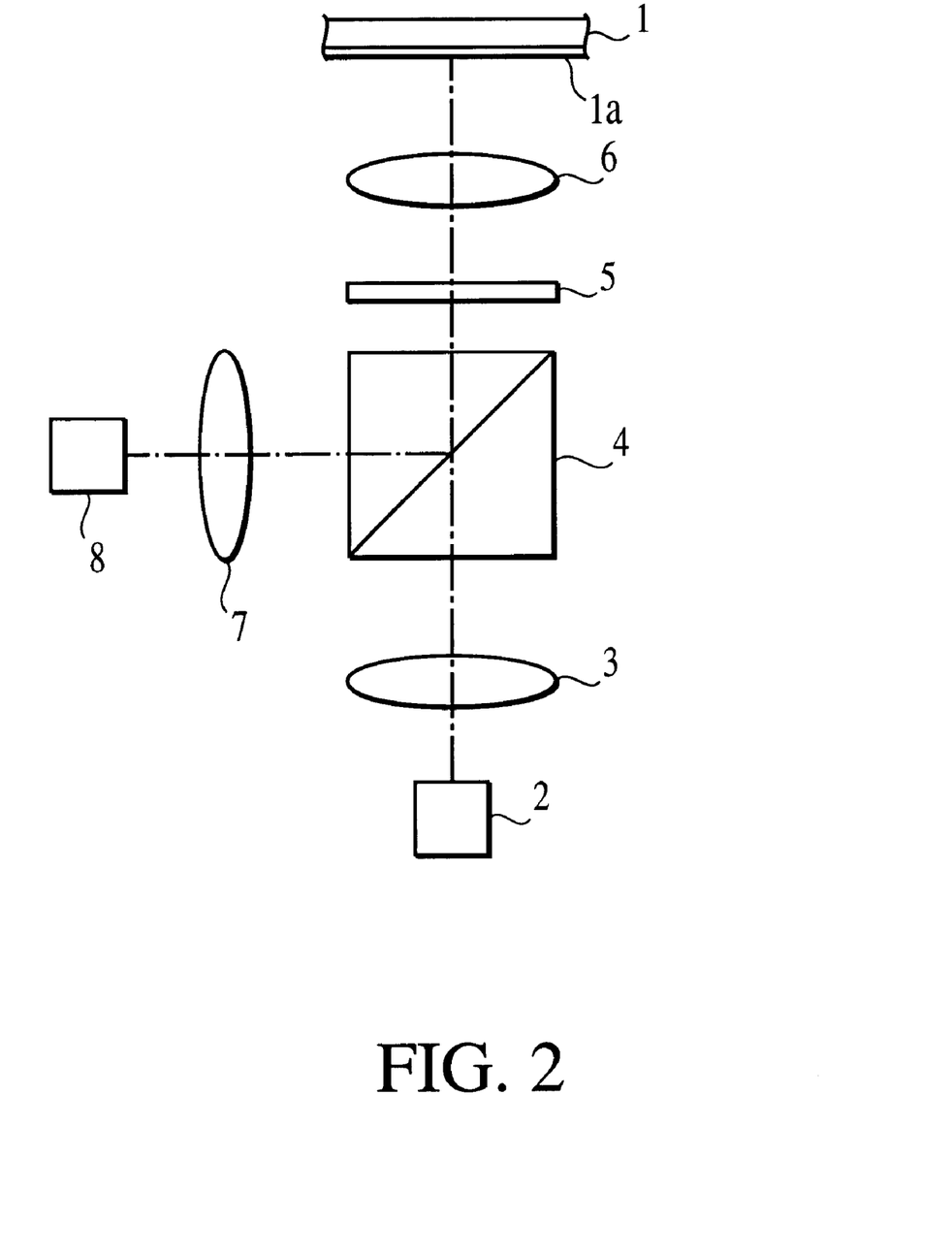
FIG. 2 is a view showing the structure of an optical pick-up device.

FIG. 2 shows the structure of the optical pick-up device of the information recording/reproducing apparatus which carries out recording and reproducing for the phase-change disc 1 by using the above recording method. After collimating the multi-phase laser ray, which radiates from the laser diode 2, by the collimator lens, the laser ray passes through a polarization beam splitting means 4, a quarter wavelength plate 5 and an objective lens 6, and is focused on a recording layer 1(a) of the phase-change disc 1. At this time, the phase-change disc 1 is rotated by the spindle motor. A reflective light from the phase-change disc 1 passes through an objective lens 6, a quarter wavelength plate 5 and again through a polarization beam splitting means 4. The reflective light then departs from the radiating ray, passes through a detecting lens 7 which enables the reflective light to be detected by a photo detector.

In recording, a pulse controlled signal is generated by a light intensity controlling means based on 8–16 modulating code. The laser diode is driven by a driving electric current in response to the pulse controlled signal in the laser diode controlling circuit. This in turn, makes the multipulse light radiate and focus on the recording layer 1(a) of the phase-change disc.

Next, recording marks are formed and information is recorded. During this time, the spindle motor is controlled using the zone CAV method. The recording frequency channel clock frequency rises in accordance with moving the laser ray to the outer area, while the rotating angular velocity remains constant. Accordingly, information recording density is constant on the whole surface of the phase-change disc. In reproducing the information, the apparatus drives the laser diode 2 using the laser diode driving circuit and radiates the reproducing power Pr. Such power is radiated on the phase-change disc 1 through the objective lens 5. The reflective light "I" is received by the photo detector 8, resulting in a reproduced signal.

In the present embodiment, as the recording rate is 8–16 modulating code, the channel clock is 1T, and PWM recording is carried out by using plural marks and spaces which change from the shortest length (xT) to the longest length (yT, where y≧x). When recording marks of yT length using the multi-pulse line light, rear heating pulses B and the rear cooling pulses C, where the number (n) of cooling pulses equates to n=y−x+1, radiate between the head heating pulse A and the last cooling pulse Cr repeatedly. As shown in FIG. 1, in the case where the shortest mark is 3T, when recording 5T, where x=3, and where Y−5, the rear heating pulse B and the rear cooling pulse C, where n=3, radiate between the head heating pulse A and the last cooling pulse Cr repeatedly.

Even though the linear speed of the phase-change disc 1 changes for the laser diode 2 using the zone CAV control method, the width of the rear heating pulse B and that of the rear cooling pulse C are constant in view of time. Therefore, the higher the linear speed and the channel clock frequency, the higher the reproducing rate of the multi-pulse for the channel clock cycle T. Therefore, it is possible to make up for the decline of the laser power by implementing a high linear speed.

Figure 1A:
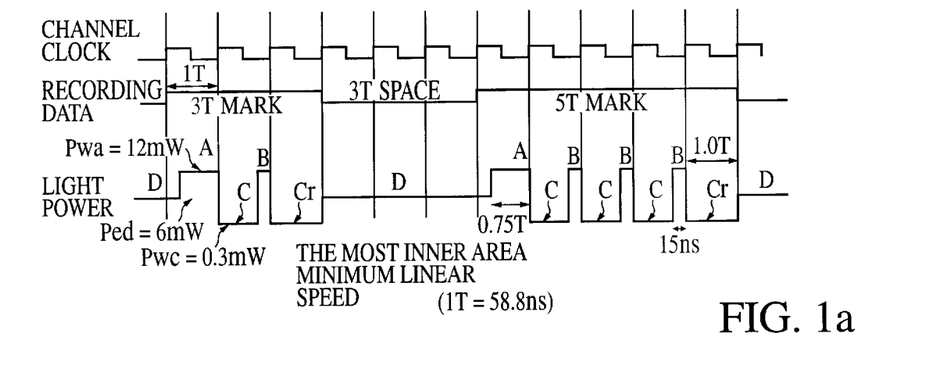
FIGS. 1(a), 1(b), 1(c) is a time chart showing a first embodiment in accordance with the present invention.
Figure 1B:
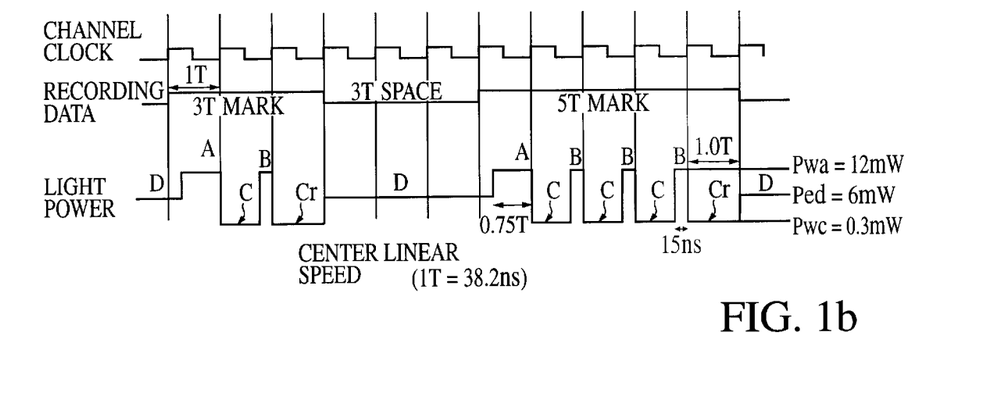
Figure 1C:
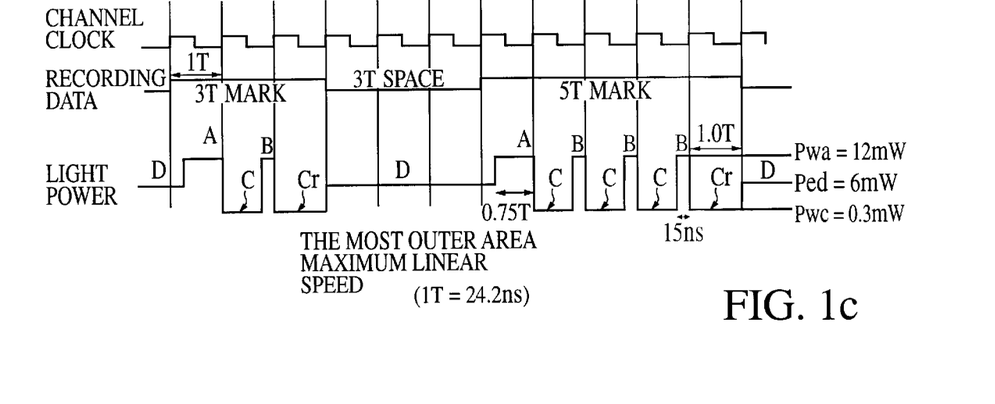

Under this situation, in the present embodiment, the width of the head heating pulse A always has a constant rate against the channel clock cycle T. FIG. 1(a) shows a pulse waveform in the most inner area with a minimum linear speed. FIG. 1(b) shows a pulse waveform in the center linear speed. FIG. 1(c) shows a pulse waveform in the most outer area with a maximum linear speed. For example, the width of the head heating pulse is set to a constant rate of 0.75T, in many cases.

Focusing on FIG. 1, a wavelength λ of the laser ray from the laser diode 2 is 635 nm. The numerical aperture (NA) is 0.6 and 1×recording is carried on the phase-change disc 1 using the zone CAV method. When the recording density of the phase-change disc 1 containing one recording layer is 3.9 GB on one side, the center linear speed is 3.49 m/s (channel clock frequency 26.16 MH) and the linear speed changes from 2.27 m/s (17.0 MH) to 5.52 m/s (41.4 MH). When the recording density of the phase-change disc 1 containing one recording layer is 3.0 GB on one side, the center linear speed is 3.49 m/s (channel clock frequency 26.16 MH) and the linear speed changes from 3.0 m/s (17.0 MH) to 7.3 m/s (41.4 MH). For example, as with laser power, the radiating power Pwa of the head heating pulse A is 12 mW, the radiating power Pwb of the serial head heating pulses B is 12 mW (which equals Pwa), the radiating power Pwc of the serial cooling pulses C is 0.3 mW, and the radiating power Ped for the erase pulse D is 6 mW.

Using FIG. 1 for an illustration, FIG. 1(a) shows the minimum linear speed in the most inner area (1T=58.8 ns). FIG. 1(b) shows the center linear speed (1T=38.2 ns). FIG. 1(c) shows the maximum linear speed (1T=24.2 ns) in the most outer area. In any cases, the width of the head heating pulse A is 0.75T, that of the rear heating pulse B is 15 ns, and that of the last cooling pulse Cr is 1T.

On account of recording on such conditions, even though the linear speed changes in the zone CAV method, it is possible to keep overwriting quality on the whole area of the phase-change disc 1 and jitter in satisfactory condition.

FIG. 3 illustrates the second embodiment using the same references as in the first embodiment. In the second embodiment, based upon changes in the recording linear speed and the recording density of the phase-change disc 1, the rate for the channel clock cycle T is set to change as the width of the head heating pulse A changes.

Figure 3A:
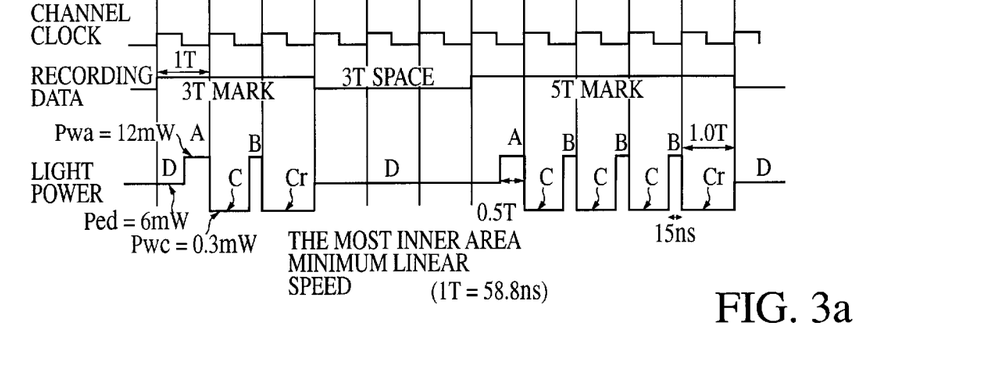
FIGS. 3(a), 3(b), 3(c) is a time chart showing a second embodiment in accordance with the present invention.
Figure 3B:
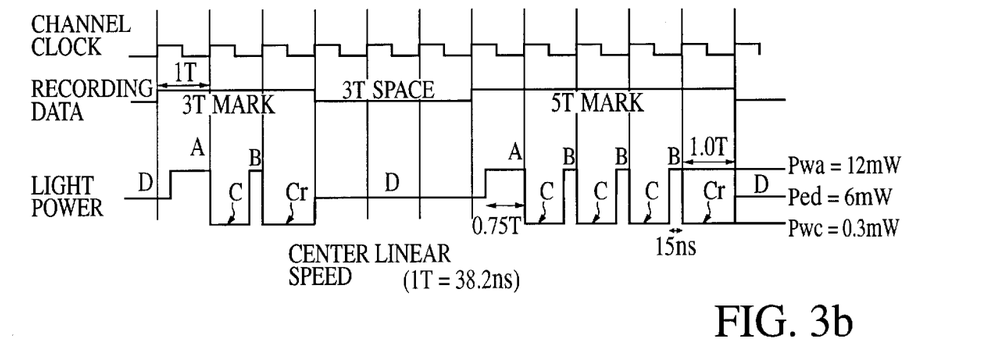
Figure 3C:
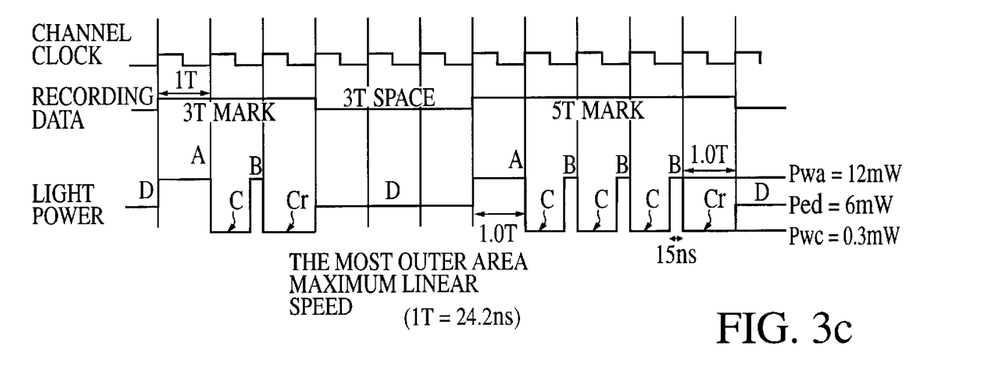

For example, based upon the center linear speed (1T=38.2 ns) of FIG. 3(b), the width of the head heating pulse A is 0.75T, the width of the rear heating pulse B is 15 ns, and the width of the last cooling pulse Cr is 1T. On the other hand, the width of the head heating pulse A in the most inner area where the linear speed (1T=58.8 ns) shown in FIG. 3(a) is lowest at 0.5T. The width of the head heating pulse A in the most outer area where the linear speed (1T=24.2 ns) shown in FIG. 3(c) is lowest at 1T.

Therefore, the rate of the channel clock cycle T is set and the width of the last cooling pulse Cr is changed so that the width of its head heating pulse A may be long in response to a higher linear speed. Thus, it is possible to prevent the reduction of power of the head portion and keep the overwriting quality and jitter in satisfactory condition.

Figure 4A:
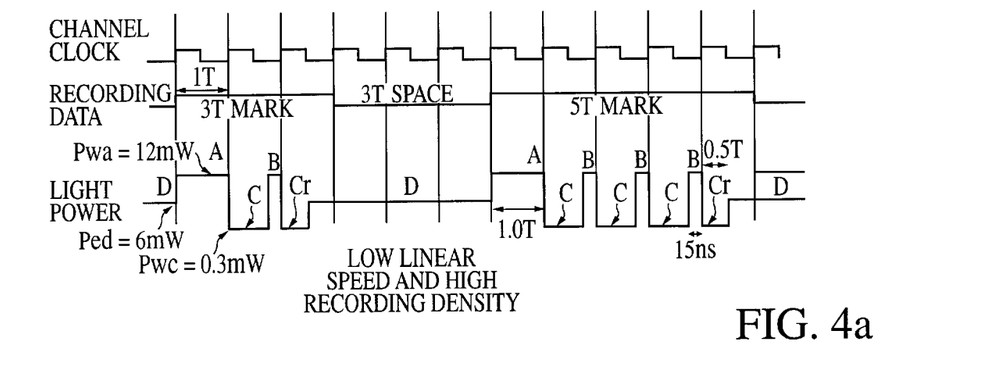
FIGS. 4(a), 4(b) is a time chart showing a third embodiment in accordance with the present invention.
Figure 4B:
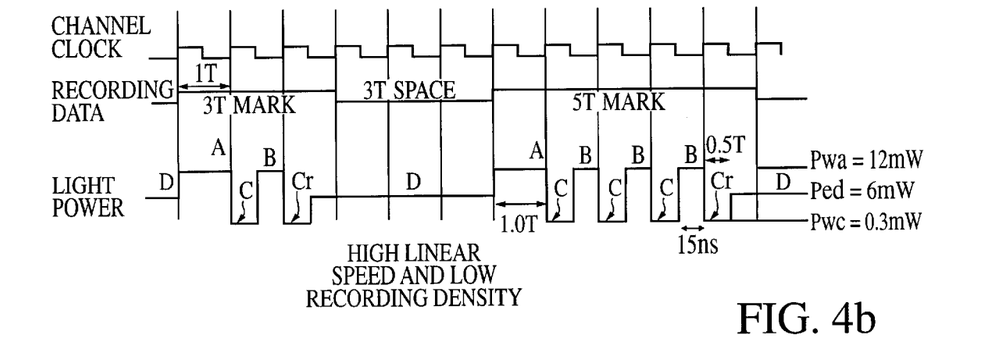

FIG. 4 shows the third embodiment of the invention. In the area where the recording linear speed of the phase-change disc 1 is lower than the center linear speed of the speed variation and recording density is higher, the rate for the channel clock frequency T of the width of the head heating pulse A is set high, and the rate for the channel clock frequency T of the width of the rear cooling pulse Cr is set to be small. On the contrary, in the area where a recording speed of the phase-change disc 1 is higher than the center linear speed of the speed change and recording density is lower, the rate for the channel clock frequency T of the width of the head heating pulse A is set high, and the rate for the channel clock frequency T of the width of the rear cooling pulse Cr is set to be small.

For example, when the recording density of the DVD disc is 3.9 GB and the information is recorded in the inner area, or when the recording density of the DVD disc is 3.0 GB and the information is recorded in the outer area of it, as shown in FIG. 4, the width of the head heating pulse A is 1T, and the width of the last cooling pulse Cr is 0.5T.

In this way, when the linear speed is lower than the center linear speed of the linear speed change and recording density is high, or when the linear speed is higher than the center linear speed of the linear speed change and the recording density is lower, it is possible to keep the overwriting quality and jitter in satisfactory condition.

Figure 5:
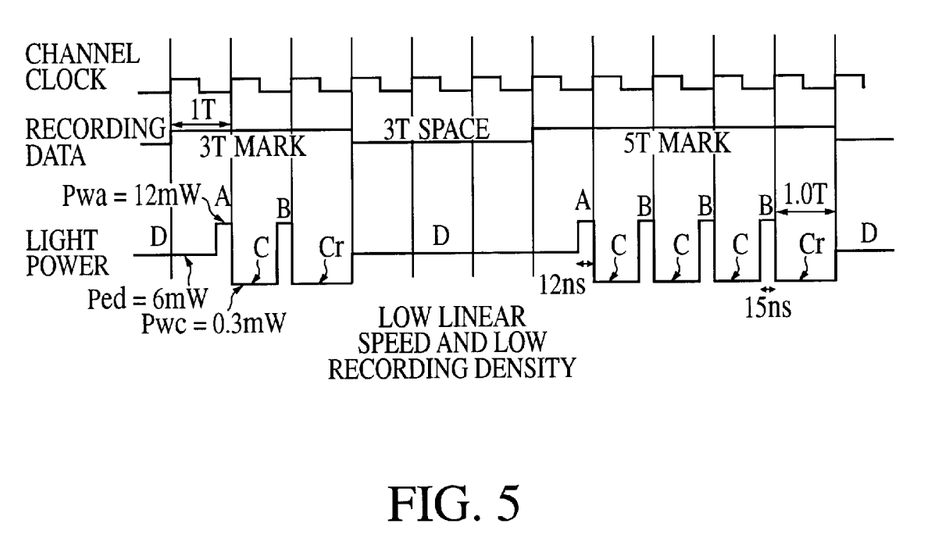
FIG. 5 is a time chart showing a fourth embodiment in accordance with the present invention.

The fourth embodiment is shown in FIG. 5. In the area where the recording speed of the phase-change disc 1 is lower than the center linear speed of the speed variation and the recording density is lower, the rate for the channel clock frequency T of the width of the head heating pulse A is set be small, and the rate for the channel clock frequency T of the width of the rear cooling pulse Cr is set high.

For example, when the recording density of the DVD disc is 3.0 GB and the information is recorded in the inner area, as shown in FIG. 5, the width of the head heating pulse A is 12 ns, which is shorter than that of the rear heating pulse. The width of the last cooling pulse Cr is 1.0T.

Therefore, when the linear speed is lower than the center linear speed of the linear speed change and the recording density is higher, it is possible to keep the overwriting quality and jitter in satisfactory condition.

Figure 6:
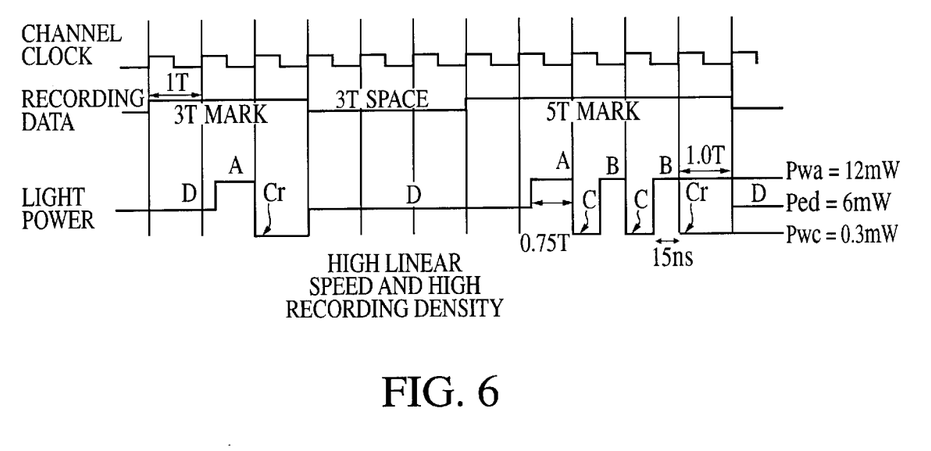
FIG. 6 is a time chart showing a fifth embodiment in accordance with the present invention.

The fifth embodiment is illustrated in FIG. 6. The present embodiment is configured such that the pulse number of the multi-pulse line can change and the width of the last cooling pulse Cr can change. In the area where the recording linear speed of the phase-change disc 1 is higher than the center linear speed of the linear speed change and recording density is higher, the pulse number of the multi-pulse line may be N−1, and the rate for channel clock frequency T of the width of the last cooling pulse Cr may be high.

For example, in case that the recording density of the DVD disc is 3.9 GB and the information is recorded in the outer area, when 3T and 5T marks are recorded, where 3T is the shortest mark, the pulse number of the rear heating pulse B is two (5−3=2). At the same time, the width of the last cooling pulse Cr is 1T.

Therefore, when the linear speed is higher than the center linear speed of the linear speed change and recording density is higher, it is possible to keep the overwriting quality and jitter in satisfactory condition.

The numerical values illustrated in the above embodiments should be selected so that the overwriting quality and jitter of the phase-change disc may be in satisfactory condition. Therefore, the above discrete numbers are simply examples.

Figure 7:
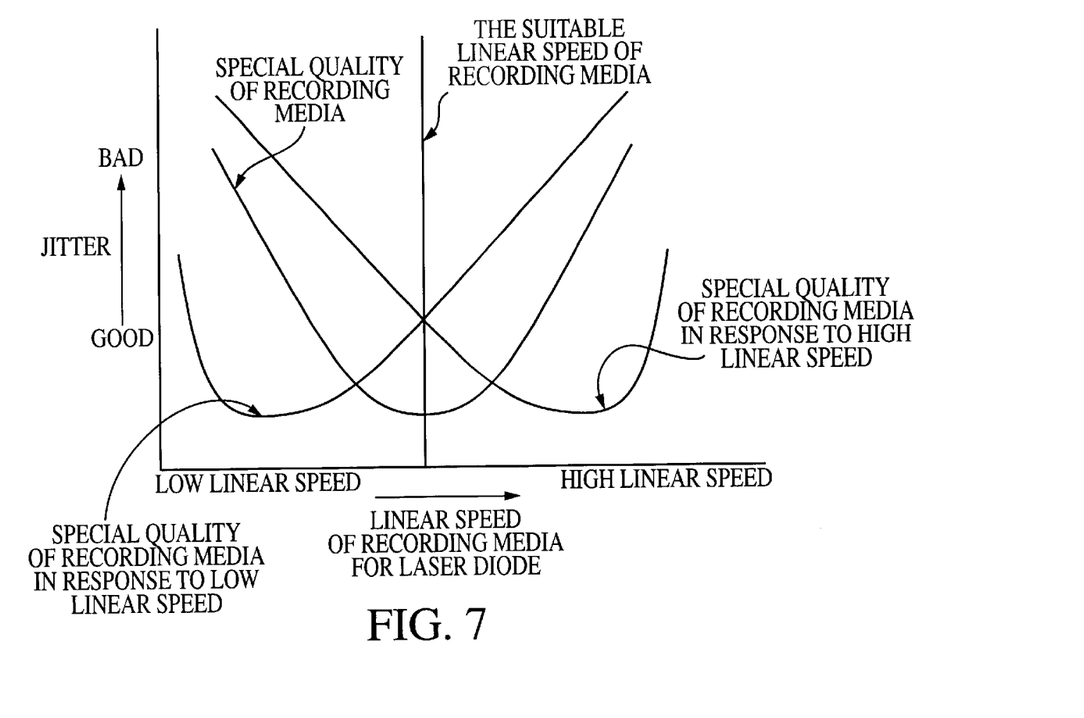
FIG. 7 is a view showing the jitter for the linear speed of the recording media in accordance with a sixth embodiment.

FIG. 7 shows the sixth embodiment. In the sixth embodiment, the most suitable linear speed in recording on the phase-change disc 1 is set to the middle value of the changing linear speed width in response to the CAV control or the zone CAV control. In response to the CAV control, the phase-change disc 1 is adjusted to obtain the best quality by the most suitable speed, as shown in the jitter quality of the recording disc corresponding to the high linear speed and the jitter quality of the recording disc corresponding to the low linear speed in FIG. 7. When recording by the methods mentioned in the above embodiments (e.g. recording on the recording disc corresponding to the low linear speed by the high linear speed), the overwriting quality and the jitter quality substantially deteriorates. Furthermore, the most suitable linear speed is set to the middle value of the width of the changing linear speed.

According to the present embodiment, even if the linear speed changes from the lowest speed to the highest speed by the CAV control method or the zone CAV control method, it does not cause deterioration of the overwriting quality and the jitter quality. Furthermore, when applying the present embodiment to the above mentioned embodiments, it is possible to obtain satisfactory overwriting quality and jitter quality.

Figure 8:
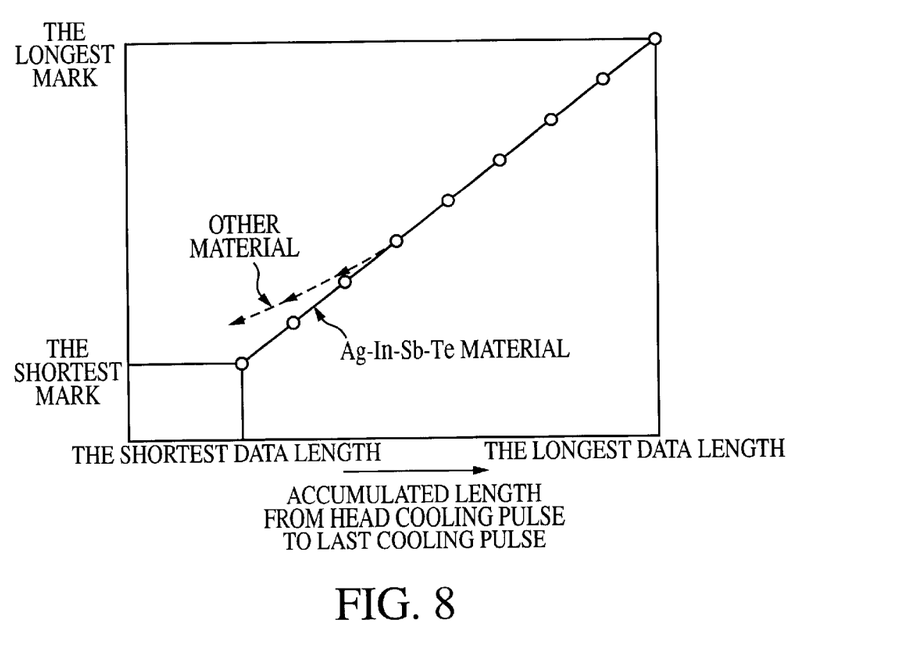
FIG. 8 is a view showing the relation between the accumulating length and the mark length for the recording material in accordance with a seventh embodiment.
Figure 9:
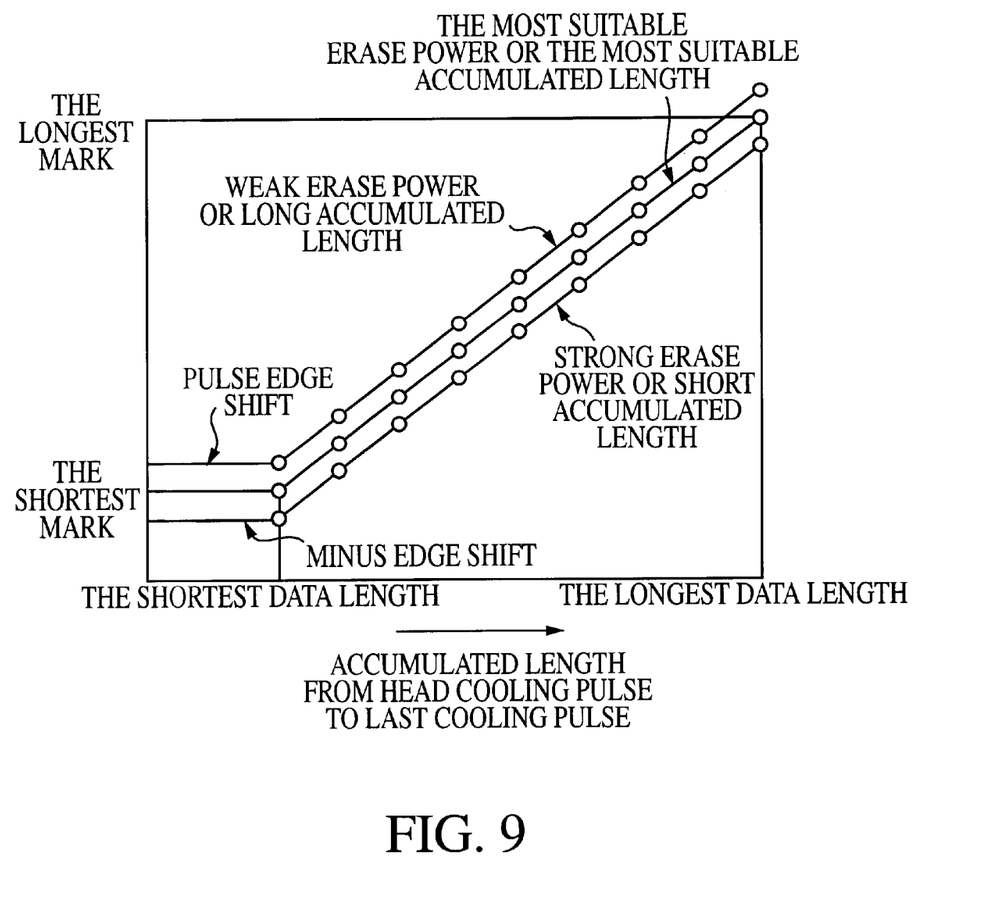
FIG. 9 is a view showing the relation between the accumulating length and the mark length for the recording material.
Figure 10:
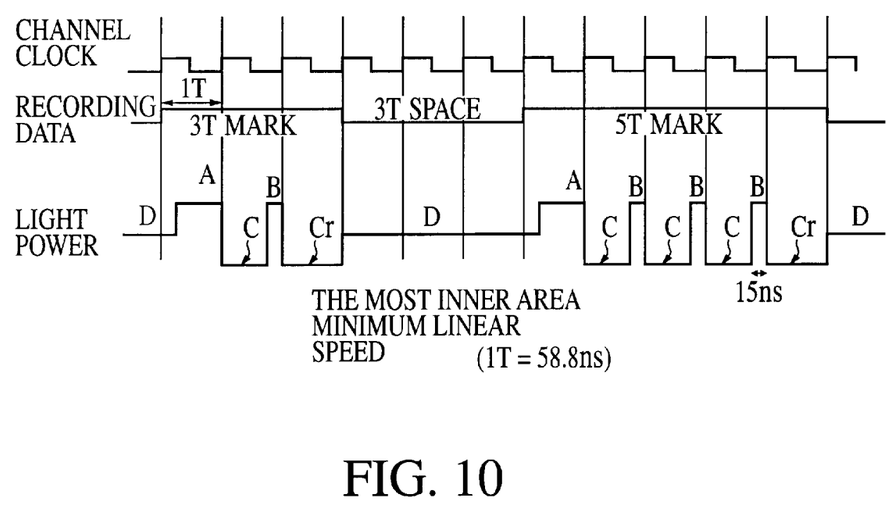
FIG. 10 is a time chart showing a general multi-pulse line.

The seventh embodiment will be next explained based on FIGS. 8 and 9. In generally, recording materials of the recording layer of the phase-change disc can be:

Ge—Sb—Te type, Ge—Te—Sb—S type, Te—Ge—Sn—A type, Ge—Te—Sn type, Sb—Se type, Sb—Se—Te type, Sn—Se—Te type, Ga—Se—Te type, Ga—Se—Te—Ge type, In—Se type, Ag—In—Sb—Te type material. In the present embodiment, Ag—In—Sb—Te type material is used as the recording material of the recording layer of the phase-change disc.

When recording data on the phase-change disc by using such recording material, the relation between the accumulated length from the head cooling pulse to the last cooling pulse and the mark length for the pulse have a tendency to correspond to each other in a straight line, resulting in an easy to control mark length. Furthermore, as shown in FIG. 9, since all data length edge-shifting occurs uniformly by an erase power or the accumulate length, accurate control is possible. Lastly, the relation of the jitter quality or overwriting quality, and the relation between recording pulse width and the mark length of Ag—In—Sb—Te type material equals that of other recording materials. Therefore, the recording method of the present invention is effective.

As mentioned above, in accordance with the above structure, the head heating pulse width is always a constant rate for the channel clock cycle T. Therefore, it is possible to keep the overwriting quality and the jitter on the whole area of the recording disc in satisfactory condition.

For changing of the recording linear speed and the recording density of the recording disc, the rate for the channel clock cycle T is set to make the width of the head heating pulse change. Therefore, it is possible to prevent the reduction of power of the head portion and keep the overwriting quality and jitter in satisfactory condition by changing the width of the last cooling pulse.

Since, the pulse number of the multi-pulse line changes and the width of the last cooling pulse changes for the recording density, data can be recorded in an ideal mark length by adequate laser power. It is possible to keep the overwriting quality and the jitter in satisfactory condition by changing the width of the last cooling pulse.

In the area where recording linear speed of the recording disc is lower than that of the center linear speed of the linear speed change and the recording density is higher, the rate for the channel clock cycle T of the head heating pulse width is set high, and the rate for the channel clock cycle T of the last cooling pulse width is set to be small. Therefore, in conditions of such linear speed and recording density, it is possible to keep the overwriting quality and the jitter on the whole area of the recording disc in satisfactory condition.

In the area where recording linear speed of the recording disc is higher than that of the center linear speed of the linear speed change and the recording density is lower, the rate for the channel clock cycle T of the head heating pulse width is set high, and the rate for the channel clock cycle T of the last cooling pulse width to be small. Therefore, in conditions of such linear speed and recording density, it is possible to keep the overwriting quality and the jitter on the whole area of the recording disc in satisfactory condition.

In the area where recording linear speed of the recording disc is lower than that of the center linear speed of the linear speed change and the recording density is lower, the rate for the channel clock cycle T of the head heating pulse width is set to be small, and the rate for the channel clock cycle T of the last cooling pulse width is set high. Therefore, in conditions of such linear speed and recording density, it is possible to keep the overwriting quality and the jitter on the whole area of the recording disc in satisfactory condition.

In the area where recording linear speed of the recording disc is higher than that of the center linear speed of the linear speed change and the recording density is higher, the pulse number of the multi-pulse line is set to N−2, and the rate for the channel clock cycle T of the last cooling pulse width is set high. Therefore, in conditions of such linear speed and recording density, it is possible to keep the overwriting quality and the jitter on the whole area of the recording disc in satisfactory condition.

The most suitable linear speed in recording data on the recording disc is set to the middle valve of the changing linear speed width in response to the CAV control or zone CAV control. Therefore, even if the linear speed changes from the lowest speed to the highest speed, it is possible to keep the overwriting quality and the jitter on the whole area of the recording disc in satisfactory condition.

Since data is recorded on the recording disc with the recording layer comprising the recording material Ag—In—Sb—Te, the relation between the accumulated length from the head heating pulse to the last cooling pulse and the mark length have a tendency to correspond to each other in a straight line, and therefore, it is easy to control the mark length.

The above description and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the invention.

What is claimed as new and desired to be protected by Letters Patent of the United States is:

1. A method of recording information which forms marks or spaces on a recording medium, said method comprising:

irradiating said recording medium by a light source in accordance with applied heating and cooling pulses;

transmitting a head heating pulse to said light source;

transmitting a head cooling pulse to said light source;

transmitting plural controlled serial rear heating pulses to said light source, wherein pulse width of said rear heating pulses is constant in view of time regardless of the recording linear speed of said recording medium; and transmitting serial rear cooling pulses to said light source.

2. The method according to claim 1, further comprising the step of said light source irradiating a laser ray to said recording medium, beginning with said head heating pulse, which records information onto said recording medium, until said rear cooling pulses are transmitted to said light source.

3. The method according to claim 1, wherein said applied heating and cooling pulses form a multi-pulse line for recording data on said recording medium.

4. The method according to claim 1, wherein said information recording method includes pulses N times as long as a channel clock cycle T radiated from said light source.

5. The method according to claim 4 further comprising applying said pulses to a portion of said medium at a constant recording frequency while said recording medium is rotated at a zone constant rotating angular velocity.

6. The method according to claim 4 further comprising applying said pulses at a constant recording frequency and a zone constant angular velocity which raises the recording frequency in accordance with movement of said irradiating light source to the outer area out of each zone on the recording medium and a constant angle speed.

7. The method according to claim 6, wherein each said zone is divided into concentric circles.

8. The method according to claim 1, wherein said recording medium has a recording layer changing into a crystal condition and an amorphous condition reversibly.

9. The method according to claim 1 further comprising setting the pulse width of the head heating pulse to a constant for a channel clock cycle T.

10. The method according to claim 1 further comprising setting a rate for a channel clock cycle T while the head heating pulse changes based upon recording linear speed of the recording medium and the recording density of the recording medium.

11. The method according to claim 3 further comprising setting the pulse number of the multi-pulse line and changing the width of the last cooling pulse for a change of the recording density of the recording medium.

12. The method according to claim 1 further comprising setting a rate for a channel clock cycle T of the head heating pulse width to be large with respect to the channel clock period, and a rate for the channel clock cycle T of the last cooling pulse width to be small with respect to the channel clock period, in the area where the recording linear speed of the recording medium is lower than the center linear speed of linear speed change and the recording density is higher than another recording density of the recording medium.

13. The method according to claim 1 further comprising setting a rate for a channel clock cycle T of the head heating pulse width to be large with respect to the channel clock period, and a rate for the channel clock cycle T of the last cooling pulse width to be small with respect to the channel clock period, in the area where a recording linear speed of the recording medium is higher than the center linear speed of linear speed change and a recording density is lower than another recording density of the recording medium.

14. The method according to claim 1 further comprising setting a rate for a channel clock cycle T of the head heating pulse width to be small with respect to the channel clock period, and a rate for the channel clock cycle T of the last cooling pulse width to be large with respect to the channel clock period, in the area where the recording linear speed of the recording medium is lower than a center linear speed of linear speed change and a recording density is lower than another recording density of the recording medium.

15. The method according to claim 3 further comprising setting a pulse number of the multi-pulse line to "N−2", and a rate for a channel clock cycle T of the last cooling pulse width to be large with respect to the channel clock period, in the area where the recording linear speed of the recording medium is higher than a center linear speed of linear speed change and the recording density is higher than another recording density of the recording medium.

16. The method according to claim 1, wherein a suitable linear speed in recording is set to be the middle value of the linear speed width and changes in response to constant angular velocity control or zone constant angular velocity control.

17. The method according to claim 1, wherein said recording layer of the recording medium includes Ag—In—Sb—Te type recording material.

18. A method of recording information which forms marks or spaces on a recording medium, said method comprising:
irradiating said recording medium by a light source;
applying heating and cooling recording pulses to the light source, wherein said applying step comprises:
transmitting a first heating pulse to said light source;
transmitting a first cooling pulse to said light source;
transmitting plural controlled serial second heating pulses to said light source, wherein the pulse width of said second heating pulses is constant in view of time regardless of recording linear speed of said recording medium; and
transmitting serial second cooling pulses to said light source.

19. The method according to claim 18, wherein said applied heating and cooling pulses form a multi-pulse line for recording data on said recording medium.

20. The method according to claim 18 wherein said recording data pulses further comprise pulses N times as long as a channel clock cycle period T radiated from said light source.

21. The method according to claim 20 further comprising applying said recording pulses to a portion of said medium at a constant recording frequency while said recording medium is rotated at a constant rotating angular velocity.

22. The method according to claim 20 further comprising applying said pulses based on a constant channel clock recording frequency and a zone constant angular velocity within a portion of a recording medium, and raising said recording frequency in accordance with movement of said irradiating light source from at least one to at least another portion on the recording medium while rotating said medium at a constant angular velocity.

23. The method according to claim 18 further comprising setting the pulse width of the first heating pulse to a constant value for a channel clock cycle period T.

24. The method according to claim 19 further comprising setting a pulse width with respect to the channel clock cycle period T while the first heating pulse changes based upon the recording linear speed of the recording medium and the recording density of the recording medium.

25. The method according to claim 19 further comprising setting the pulse number N of the multi-pulse line and changing the pulse width of the second cooling pulse for a change of the recording density of the recording medium.

26. The method according to claim 18 further comprising setting the first heating pulse width to be large with respect to the channel clock period T and the second cooling pulse width to be small with respect to the channel clock period T, where recording linear speed of the recording medium is lower than a center linear speed and the recording density is higher.

27. The method according to claim 26 wherein the higher recording density is higher than another recording density of the recording medium.

28. The method according to claim 18 further comprising setting the first heating pulse width to be large with respect to the channel clock period T, and the second cooling pulse width to be small with respect to the channel clock period T, in the area where recording linear speed of the recording medium is higher than a center linear speed and the recording density is lower than another recording density of the recording medium.

29. The method according to claim 18 further comprising setting the first heating pulse width to be small with respect to the channel clock period T, and the second cooling pulse width to be large with respect to the channel clock period T, in the area where recording linear speed of the recording medium is lower than a center linear speed and recording density is lower than another recording density of the recording medium.

30. The method according to claim 19 further comprising setting the pulse number of the multi-pulse line to "N–2", and a fractional multiplier times the channel clock cycle period T of the second cooling pulse width to be large with respect to the channel clock period, in an area where recording linear speed of the recording medium is higher than a center linear speed of the linear speed change and recording density is higher than another recording density of the recording medium.

31. A method of recording information which forms marks or spaces on a recording medium, said method comprising:
 irradiating said recording medium by a light source;
 applying heating and cooling recording pulses to the light source, wherein said applying step comprises:
  transmitting a first heating pulse to said light source;
  transmitting a first cooling pulse to said light source;
  transmitting plural controlled serial second heating pulses to said light source, wherein the pulse width of said second heating pulses is constant in view of a clock channel period T regardless of recording linear speed of said recording medium within a portion of the recording medium; and
  transmitting serial second cooling pulses to said light source.

* * * * *